United States Patent [19]

Gustavsson et al.

[11] 4,115,262

[45] Sep. 19, 1978

[54] MAGNETIC SEPARATOR

[75] Inventors: Rolf Gustavsson; Per Hedvall, both of Vesteras, Sweden

[73] Assignee: ASEA Aktiebolag, Västerås, Sweden

[21] Appl. No.: 803,645

[22] Filed: Jun. 6, 1977

[30] Foreign Application Priority Data

Jan. 9, 1976 [SE] Sweden .................. 76064625

[51] Int. Cl.[2] .............................................. B01D 35/06

[52] U.S. Cl. .................................. 210/42 S; 209/222; 209/229; 210/223; 210/408

[58] Field of Search ............... 209/228, 229, 232, 222; 210/223, 332, 334, 408, 42

[56] References Cited

U.S. PATENT DOCUMENTS

| | | | |
|---|---|---|---|
| 3,471,026 | 10/1969 | Riker | 210/334 X |
| 3,959,145 | 5/1976 | Lundquist et al. | 210/223 |
| 3,985,656 | 10/1976 | Arvanitakis | 210/334 X |

*Primary Examiner*—Frank A. Spear, Jr.
*Assistant Examiner*—Richard W. Burks
*Attorney, Agent, or Firm*—Watson, Cole, Grindle & Watson

[57] ABSTRACT

Suspended contaminated particles are removed by magnetic separation from a liquid containing ferromagnetic particulate material to which the particles adhere. A plurality of radially extending filter discs are provided on a horizontally disposed rotatable shaft for rotation therewith, the liquid being directed toward the discs and through gaps provided therebetween. Permanent magnets are provided on the discs for producing local magnetic field gradients in the gaps, and the discs have non-magnetic portions outwardly of the magnets along the periphery of the discs. The particulate material is scraped from the discs which adhere thereto when the liquid passes the gaps, and the scraped material is moved outwardly of the discs. After scraping, jets of a fluid are directed toward the inner portion of the discs for impacting the non-magnetic portions with the fluid so that the liquid from which the particles have been separated, when subsequently directed outwardly of the discs, does not contain any particulate material scraped from the discs.

8 Claims, 6 Drawing Figures

MAGNETIC SEPARATOR

Figure 1:
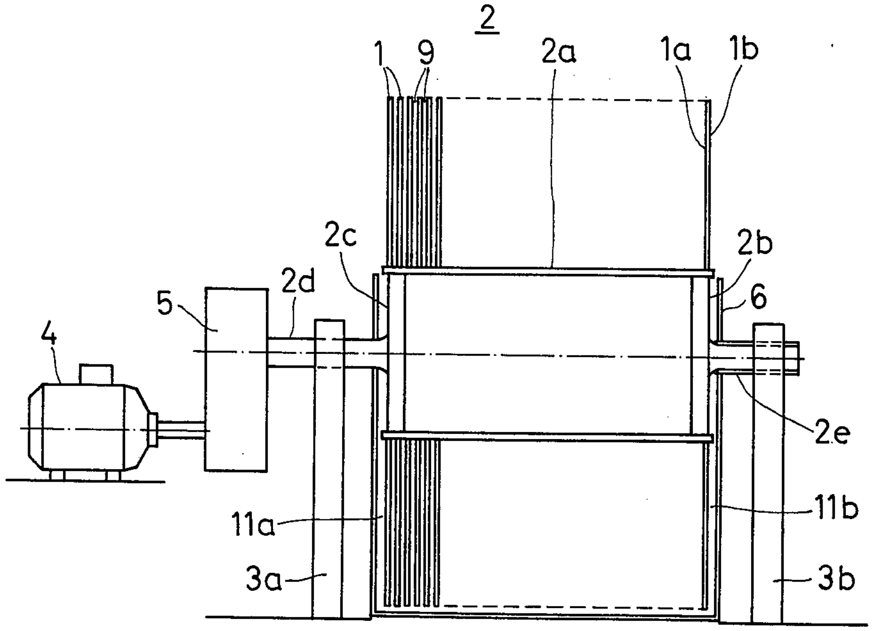

It is well-known that liquids contaminated with suspended particles or dissolved high-molecular substances, for example resinous substances, can be cleaned by adding a particulate ferromagnetic material, for example magnetite, iron, cobalt or nickel, to the liquid and separating the contaminant together with the ferromagnetic material in a magnetic field. It is also known to perform a similar separation on liquids which, from the start, are contaminated with ferromagnetic particulate material, for example coolant leaving machine tools, for example lathes and drills. Contaminated gases can also be cleaned in principle by the addition of a particulate ferromagnetic material and treatment in a magnetic field for separation of the contaminant. It is also known to use chemical flocculating agents simultaneously in the cleaning process, for example lime, alum, iron chloride, polyelectrolytes and water glass.

In the above described cleaning operations a magnetic separator is used. One such known separator comprises a plurality of substantially parallel filter discs which are secured, in axially spaced relationship, along a rotatable shaft. The filter discs contain permanent magnets which produce magnetic field gradients in the spaces located between the filter discs. The medium that is to be filtered and which, when entering the separator, contains a particulate ferromagnetic material, is caused to pass these spaces, resulting in the contaminants adhering to the walls of the filter discs. The separator is also provided with a scraper means for scraping off the material which has adhered to the filter discs. The scraper means may comprise, for example, endless conveyor belts, each of which enters into a space between the filter discs and extends outside the filter discs. Such a scraper means also takes care of the removal of the contaminants. Alternatively, the scraper means may, for example, be of a fingerlike type, in which case one finger enters each space between the filter discs.

Magnetic separators of the type described normally lack magnets in their peripheral parts. One problem with such filters is that part of the particulate material, usually having a slimy consistency, adheres to the discs after the scraping and that the part of the remaining particulate material which adheres to the peripheral parts, where there are no magnets, is flushed away by the already filtered liquid, usually water, upon the rotation of the filter discs, thus re-contaminating this liquid. The remaining material which sticks to the interior parts of the discs, where there are magnets, will, however, remain on the filter discs.

According to the present invention this problem is solved in a simple and efficient manner with the result that the efficiency of the separator is considerably improved and that a filtered liquid of higher purity is obtained. The solution is that the particulate material remaining on the peripheral parts of the discs is moved, with the help of directed jets of a liquid or gas, to the interior parts of the discs before the peripheral parts make contact with filtered water.

More particularly, the present invention relates to a magnetic separator with a number of substantially parallel filter discs which are attached, radially directed, along a rotatable shaft and having gaps located between the filter discs for the liquid medium to be filtered which, when entering the separator, contains a ferromagnetic particulate material, the filter discs having inner magnetic parts for achieving magnetic field gradients in said gaps and peripheral non-magnetic parts, and the filter for scraping off the particulate material, which adheres to the filter discs when the medium moves past the gaps, being provided with a scraper means which enters into the gaps between the filter discs, characterised in that outside the peripheries of the filter discs and below the scraper means there is arranged a device for generating jets of a liquid or gas which hit the peripheral parts of the discs and are directed towards the interior parts of the discs, the particles remaining on the peripheral parts after scraping thus being movable to the interior parts of the discs.

The liquid from the which jets are generated is preferably a liquid of the same kind as the medium which is filtered in the separator, usually water, but may in principle consist of another liquid which does not constitute a harmful addition to the filtered medium. Alcohols, such as methanol and ethanol may often be used if the medium to be filtered consists of water. When using gas it is suitable to choose air or another gas which has low solubility in the medium filtered in the separator or which has no harmful effect on the filtered liquid. Besides air, nitrogen gas is a suitable gas if the medium consists of water.

The means for generating the jets suitably consists of a tube, a container or the like, containing the liquid or the gas under pressure and provided with narrow slits or holes by which the desired direction of the jets is achieved.

Figure 2:
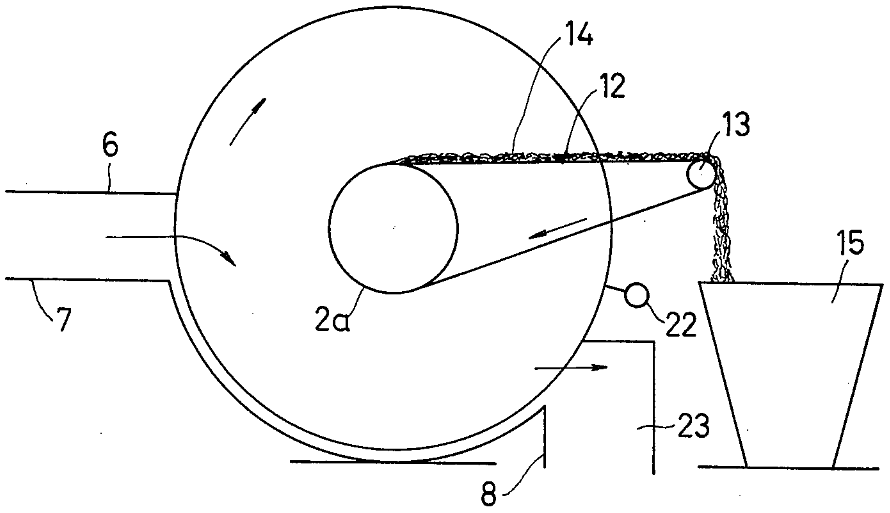
Figure 3:
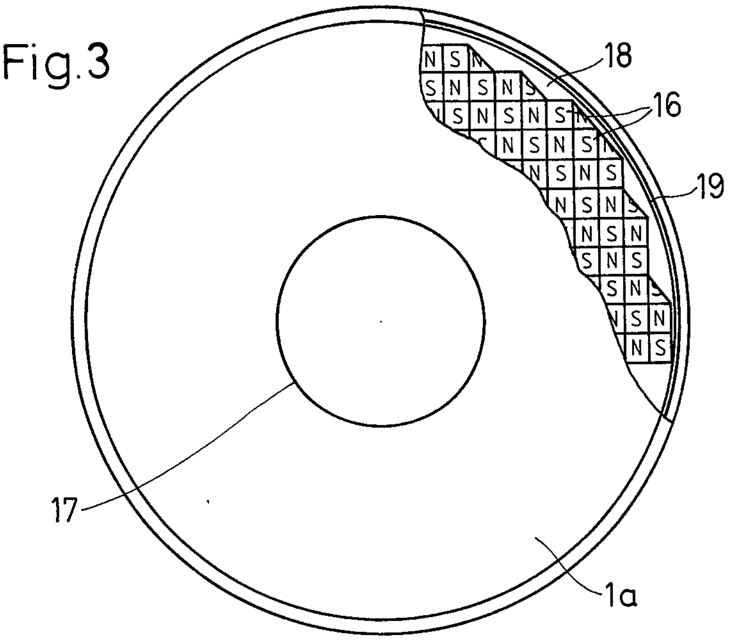
Figure 4:
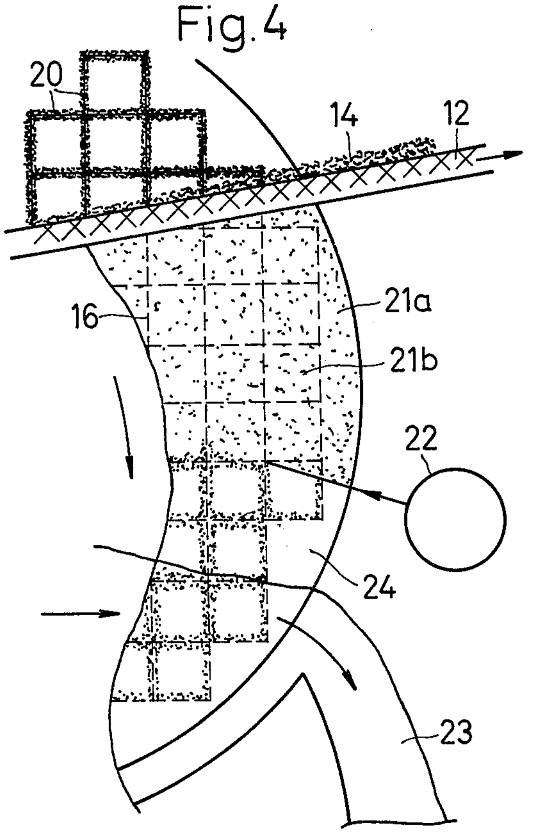
Figure 5:
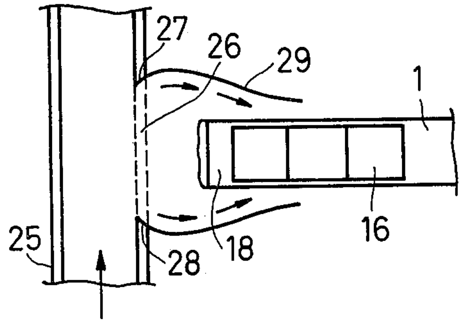
Figure 6:
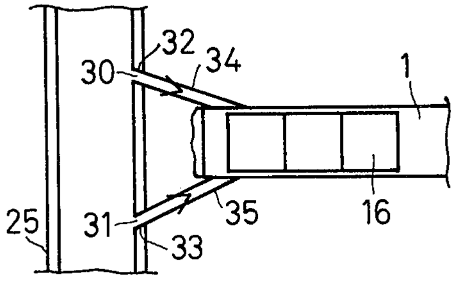

The invention will be described in more detail by way of example with reference to the accompanying drawing, in which FIG. 1 schematically shows a separator according to the invention perpendicular to the direction of flow of the medium (the scraper means not being shown), FIG. 2 shows the same separator of FIG. 1 in the direction of flow of the medium, FIG. 3 schematically shows a filter disc in the separator according to FIGS. 1 and 2, one wall being partly removed, FIG. 4 shows part of the separator according to FIGS. 1 and 2 under filtration, and FIGS. 5 and 6 show different embodiments of the means for generation of the jets of the liquid or the gas.

The magnetic separator according to FIGS. 1 and 2 comprises a plurality of filter discs 1, each of which includes two parallel walls 1*a* and 1*b* between which permanent magnets are arranged, as will be explained further with reference to the description of FIG. 3. The filter discs are arranged parallel to each other along a shaft 2 of the separator and are radially directed. The shaft 2 of the separator comprises, in the exemplified case, a central, wider part 2*a*, flanges 2*b* and 2*c* and shaft ends 2*d* and 2*e* which are journalled in supports 3*a* and 3*b*. The shaft is driven by a motor 4 via a gear 5. The unit consisting of the filter discs mounted on the shaft 2 is arranged in a tank 6 for the medium to be cleaned which, in the exemplified case is contaminated water. The tank inlet is designated 7 and its outlet 8. When flowing through the separator the medium is conveyed through gaps 9 between adjacent discs 1. In this process, ferromagnetic particles, to which substances to be separated are attached, adhere to the walls of the separator and accompany these walls as the discs rotate, which preferably takes place against the direction of flow of the medium. The separator is provided with a scraper means 10 consisting of endless conveyor belts arranged in each gap 9 between the discs and in gaps 11*a* and 11*b* outside the axially outermost walls. In the exemplified case, each conveyor belt consists of a belt 12 of rubber or stainless steel which surrounds the central part 2*a* of the separator shaft and a roll 13 located radially outside the discs. The belt 12 can be driven either by the separator shaft or the roll 13 or by a separate drive means. When the discs rotate the adherent material is scraped off when passing the belt 12. The belt 12 does not have to run tightly against the discs 1, and in fact there can be a small clearance to reduce wear. The material 14 scraped off by the belt 12 is transported by the belt to a collecting container 15. It is possible to have a simple scraper arranged at the roll 13 to prevent scraped-off material from being returned to the separator.

As is clear from FIG. 3, each filter disc 1 consists of walls 1*a* and 1*b*, for example of stainless steel and having a thickness of 0.5 mm. Permanent magnets 16 for example of barium ferrite, are closely packed between the walls from the shaft hole 17 to the peripheral parts 18, where there are no magnets. The magnets may be fixed to the walls by an adhesive. The magnets may, for example, have a length in the magnetizing direction of 5–10 mm and a cross sectional area of from 1 to 5 $cm^2$ perpendicular to the magnetizing direction. Two adjacent magnets within the same filter disc have different polarities in the example shown. In this way a maximum field gradient is formed. Possibly, a band 19 of soft iron may be arranged in the peripheral parts and make these parts field-free to reduce the adhesion of the particulate material to that part. The space outside the magnets, that is the peripheral parts 18, is otherwise filled with a non-magnetic material, for example a rubber material.

When the separator operates, the particulate material 20 adheres to the filter discs, as is clear from FIG. 4, and is located along the edges of the underlying magnets. When the discs pass the scrapers 12, the scraped-off material 14 is collected thereon and is removed. However, part of the particulate material 21 remains on the discs, of which one part 21*a* will be located in the peripheral parts and one part 21*b* in the interior parts outside the underlying magnets 16.

According to the present invention, a means 22 for generating water jets is arranged outside the filter discs and below the scraper means, but above the filtered water 23. The means 22 moves particulate material 21*a* from the peripheral parts to the interior parts of the discs so that the peripheral parts, after passing the means, become free from particulate material. The cleaned area is designated 24.

According to a suitable embodiment of the invention, shown in FIG. 5, the means 22 consists of a tube 25 which is arranged at least substantially parallel to the shaft of the separator and is provided with a narrow, elongated slit 26 outside each disc. The slit extends outside the extensions of the sides of the filter discs. The walls 27 and 28 which limit the slit in its longitudinal direction suitably diverge in a direction from the tube to a disc. In this way and because the slits are narrow, a well-defined and directed jet 29 is obtained. This means is primarily intended to be used when the jets consist of a liquid.

According to another suitable embodiment of the invention, shown in FIG. 6, the tube is instead provided with small holes 30 and 31 with limiting walls 32 and 33 which direct the jets 34 and 35 towards the peripheral parts of the disc and further towards the interior parts of the disc. This means is suitable for use both when the jets consist of a liquid and when they consist of a gas.

We claim:

1. A magnetic separator including a horizontally disposed rotatable shaft, a plurality of substantially parallel filter discs attached along said shaft and located in planes perpendicular thereto with gaps between said discs for the passage of a liquid medium to be cleaned, said medium which enters the separator containing ferromagnetic particulate material, said discs containing permanent magnets spaced inwardly of the peripheral edges thereof for producing local magnetic field gradients in the gaps, said discs having a non-magnetic portion in an area outwardly of said magnets along the periphery of said discs, the separator being provided with scraper means for the particulate material which adheres to said discs when the medium passes the gaps, said scraper means entering the gaps between said discs and extending outwardly thereof, a tank for containing the liquid medium to be cleaned, said tank having a liquid inlet and a liquid outlet, said shaft being rotatably mounted on opposing side walls of said tank for immersing said discs in the liquid medium during rotation of said shaft, means disposed below said scraper means, above said outlet and outwardly of said periphery of said discs for generating jets of a fluid, said generating means being directed toward an inner portion of said discs for impacting said non-magnetic portion with the fluid, whereby any particulate material remaining on said non-magnetic portion below said scraper means during the rotation of said shaft is moved to said inner portion of said discs so as to adhere to said magnets to thereby avoid being flushed away by the liquid medium which exits through said liquid outlet.

2. The magnetic separator according to claim 1, wherein said means for generating jets of the fluid comprises a tube, and a receptacle containing the fluid under pressure, said tube having a plurality of slits therein corresponding to the number of said filter discs, said slits extending along the periphery of said discs with the longitudinal direction thereof lying substantially parallel to the central axis of said shaft.

3. The magnetic separator according to claim 2, wherein each of said slits has a predetermined length such that opposing ends thereof lie outwardly of opposing sides of said discs.

4. The magnetic separator according to claim 3, wherein said opposing ends of each of said slits diverge in a direction toward the periphery of said discs.

5. The magnetic separator according to claim 1, wherein said means for generating jets of the fluid comprises a tube, and a receptacle containing the fluid under pressure, said tube having a plurality of holes therein associated with said discs and being directed toward the periphery of said discs.

6. The magnetic separator according to claim 1, wherein the fluid comprises water.

7. A method of removing suspended contaminated particles from a liquid containing ferromagnetic particulate material to which the particles adhere, by magnetically separating the particles and the particulate material from the liquid, comprising the steps of, providing a plurality of substantially parallel filter discs extending radially and attached along a horizontally disposed rotatable shaft, said discs having gaps therebetween, rotating said discs about a central axis of said shaft, directing the liquid toward said discs and through the gaps, providing permanent magnets on said discs for producing local magnetic field gradients in the gaps, providing non-magnetic portions on said discs outwardly of said magnets along the periphery of said discs, scraping the particulate material from said discs which adhere thereto when the liquid passes the gaps, moving the scraped material outwardly of said discs, directing the liquid from which the particles have been separated outwardly of said discs, generating jets of a fluid, after the step of scraping and before the step of directing the liquid outwardly of said discs, toward an inner portion of said discs for impacting said non-magnetic portions with the fluid, whereby any particulate material remaining on said non-magnetic portions after being scraped from said discs is moved to said inner portion of said discs to adhere to said magnets to thereby avoid being directed outwardly of said discs.

8. The method according to claim 7, wherein the jets of the fluid are directed toward opposing sides of said discs.

* * * * *